United States Patent
Kikuchi et al.

(10) Patent No.: US 8,592,546 B2
(45) Date of Patent: Nov. 26, 2013

(54) SILICON-CONTAINING ALICYCLIC POLYIMIDE RESIN, POLYAMIC ACID RESIN, AND MANUFACTURING METHOD FOR SAME

(75) Inventors: Tooru Kikuchi, Ibaraki (JP); Toshihiko Takasaki, Ibaraki (JP); Katsuyuki Masuda, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 13/583,727

(22) PCT Filed: Apr. 13, 2011

(86) PCT No.: PCT/JP2011/059209
§ 371 (c)(1),
(2), (4) Date: Sep. 27, 2012

(87) PCT Pub. No.: WO2012/020584
PCT Pub. Date: Feb. 16, 2012

(65) Prior Publication Data
US 2013/0158225 A1    Jun. 20, 2013

(30) Foreign Application Priority Data
Aug. 9, 2010  (JP) ................................. 2010-179059

(51) Int. Cl.
*C08G 77/452*  (2006.01)
(52) U.S. Cl.
USPC .................. 528/28; 528/25; 528/26; 528/31; 528/40
(58) Field of Classification Search
None
See application file for complete search history.

(56) References Cited

U.S. PATENT DOCUMENTS

| 4,404,350 | A | 9/1983 | Ryang |
| 7,256,248 | B2 * | 8/2007 | Sugo .............................. 528/28 |

FOREIGN PATENT DOCUMENTS

| JP | 5-98237 | 4/1993 |
| JP | 2000-143802 | 5/2000 |
| JP | 2006-267800 | 10/2006 |
| JP | 2006-349852 | 12/2006 |
| JP | 2007-302635 | 11/2007 |
| WO | WO 2010/095329 A1 | 8/2010 |

OTHER PUBLICATIONS

S. A. Swint, et al., "Synthesis of Poly(imidosiloxanes) via Disiloxane Equilibration Reactions", *Macromolecules*, vol. 23, No. 21, 1990, pp. 4514-4518.
S. Wu, et al., "Synthesis and Characterization of Organosoluble Polysiloxaneimides Derived from Siloxane-containing Aliphatic Dianhydride and Various Aromatic Diamines", *High Performance Polymers*, vol. 20, No. 3, Jun. 2008, pp. 282-295.

* cited by examiner

*Primary Examiner* — Marc Zimmer
(74) *Attorney, Agent, or Firm* — Antonelli, Terry, Stout & Kraus, LLP.

(57) ABSTRACT

A polyimide resin including repeating units represented by formula (1):

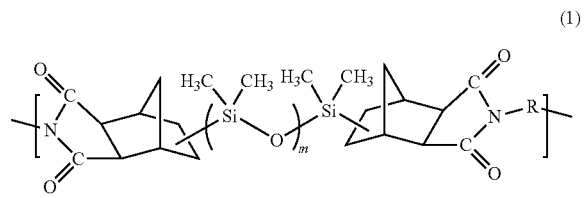

(1)

wherein R is a diamine residue or a diisocyanate residue; m is an integer of 2 to 30; any of silicon atoms bonded to norbornane rings is in exo configuration with respect to the norbornane rings; and any of imide rings bonded to the norbornane rings is in exo configuration with respect to the norbornane rings, and a polyamic acid resin including repeating units represented by formula (2):

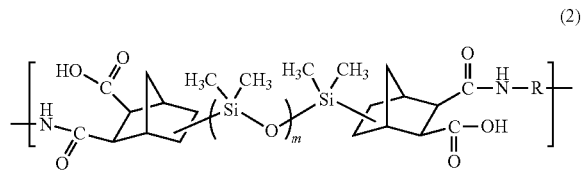

(2)

wherein R is a diamine residue; m is an integer of 2 to 30; any of silicon atoms bonded to norbornane rings is in exo configuration with respect to the norbornane rings; and any of amide groups and carboxyl groups bonded to the norbornane rings is in exo configuration with respect to the norbornane rings. The polyimide resin is soluble in general-purpose solvents, has a good transparency and a high molecular weight, and is excellent in mechanical properties, such as tensile strength and elongation.

3 Claims, 5 Drawing Sheets

SILICON-CONTAINING ALICYCLIC POLYIMIDE RESIN, POLYAMIC ACID RESIN, AND MANUFACTURING METHOD FOR SAME

TECHNICAL FIELD

The present invention relates to novel silicon-containing alicyclic polyimide resins and polyamic acid resins, and processes for producing these resins.

BACKGROUND ART

In the application field of optoelectronics, such as optical devices, displays and optical information transmission, intensive research and development of transparent materials have been made and the utilization of the transparent materials has been studied. In the above application field, a wavelength ranging from 350 to 500 nm tends to be positively utilized from the viewpoints of high energy density and efficiency.

As high-performance polymers for electronic equipments, polyimide resins are generally known. In particular, from the viewpoint of good heat resistance, aromatic polyimide resins have been conventionally used. However, the aromatic polyimide resins absorb light in the above wavelength range and their use as a transparent material is limited. Therefore, the development of non-aromatic polyimide resins having high heat resistance comes to be demanded. In addition, heat-resistant transparent materials to be applied to the field of optoelectronics are required to be good not only in mechanical properties, such as tensile strength and elongation at break, but also in properties, such as adhesion to silicon substrates or glass substrates and solubility in general-purpose solvents.

To obtain polyimide resins having the above-mentioned properties, it has been studied to use a silicon-containing alicyclic tetracarboxylic dianhydride as a constituting unit of the polyimide resins.

For example, Patent Document 1 discloses a polyimide resin produced using a tetracarboxylic dianhydride represented by formula (4):

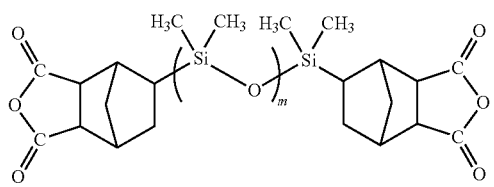

(4)

which is synthesized from 5-norbornene-2,3-dicarboxylic anhydride and a dimethylsiloxane terminated at each end with a hydrosilyl group.

Non-Patent Document 1 discloses a polyimide resin produced using a tetracarboxylic dianhydride represented by formula (5):

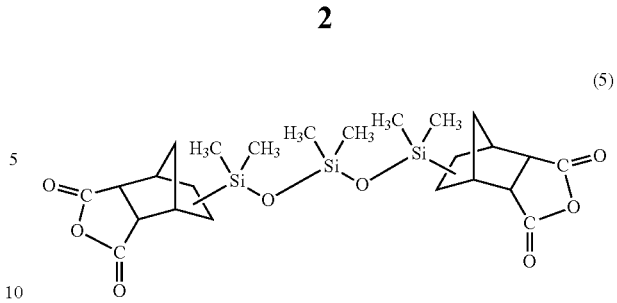

(5)

which is synthesized from 5-norbornene-endo-2,3-dicarboxylic anhydride and hexamethyltrisiloxane. It is reported that this polyimide resin is transparent to light with a wavelength of 350 nm or longer.

Non-Patent Document 2 discloses a polyimide resin which is produced by a very specific polymerization method (disiloxane equilibration reaction). The polyimide resin is terminated at each end with a pentamethyldisiloxane structure and has repeating units derived from a tetracarboxylic dianhydride represented by formula (6):

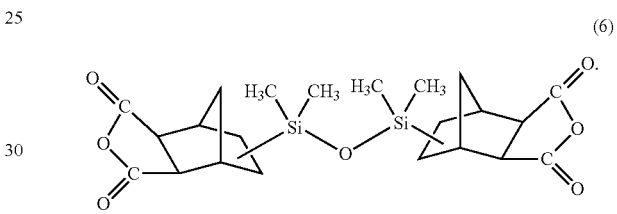

(6)

PRIOR ARTS

Patent Documents

Patent Document 1: U.S. Pat. No. 4,404,350

Non-Patent Documents

Non-Patent Document 1: "High Performance Polymers", 20, 281-295 (2008)

Non-Patent Document 2: "Macromolecules", Vol. 23, No. 21, 4514-4518 (1990)

DISCLOSURE OF THE INVENTION

Patent Document 1 does not specifically describe the stereostructure of the norbornanecarboxylic anhydride moiety at each terminal end of the tetracarboxylic dianhydride. In the working example of Patent Document 1, a tetracarboxylic dianhydride represented by formula (4) wherein m is 1 is synthesized as white crystals. The fact that the tetracarboxylic dianhydride synthesized in the working example of Patent Document 1 is crystalline shows that the synthesized product is a tetracarboxylic dianhydride represented by formula (7):

(7)

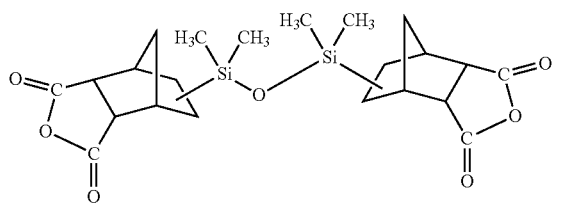

wherein the norbornanecarboxylic anhydride moiety at each terminal end is in endo form.

The tetracarboxylic dianhydride disclosed in Non-Patent Document 1 is a tetracarboxylic dianhydride represented by formula (5) wherein the norbornanecarboxylic anhydride moiety at each terminal end is in endo form.

As a result of the studies made by the inventors, as described in JP 2010-254602A, the inventors have found that the tetracarboxylic dianhydride has three isomers, i.e., R—S isomer, R—R isomer and S—S isomer respectively represented by formulae (5a), (5b) and (5c):

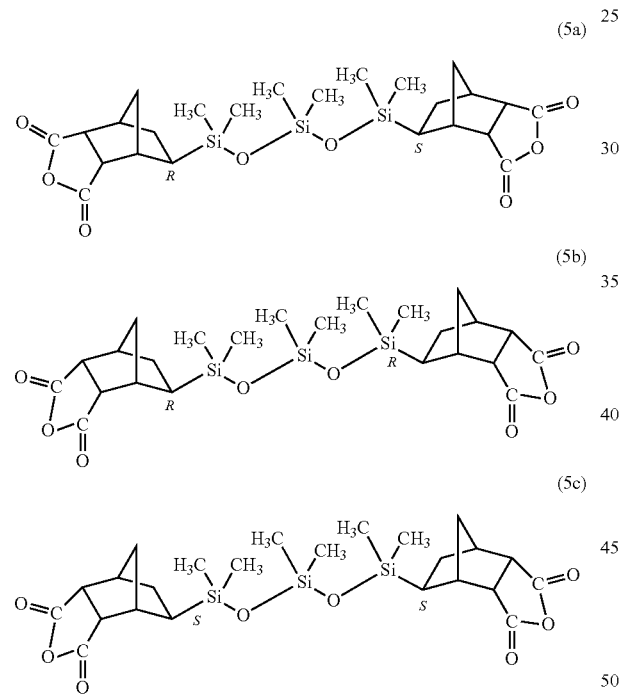

according to the positions of the norbornane rings to which two silicon atoms are bonded, and further found that the tetracarboxylic dianhydride is separated into a meso isomer (R—S isomer) having a melting point of 143.5 to 144.5° C. and a racemic mixture (pair of R—R isomer and S—S isomer) having a melting point of 119.5 to 121.5° C.

However, Non-Patent Document 1 merely describes that the polyimide resin is synthesized from a tetracarboxylic dianhydride having a melting point of 133.4 to 133.9° C.

In both the tetracarboxylic dianhydrides described in Patent Document 1 and Non-Patent Document 1, the norbornanecarboxylic anhydride moiety at each terminal end is in endo form.

Non-Patent Document 2 describes that a polyimide resin is synthesized from a tetracarboxylic dianhydride represented by formula (7) wherein the norbornanecarboxylic anhydride moiety at each terminal end is in endo form and m-phenylenediamine according to chemical equation (1):

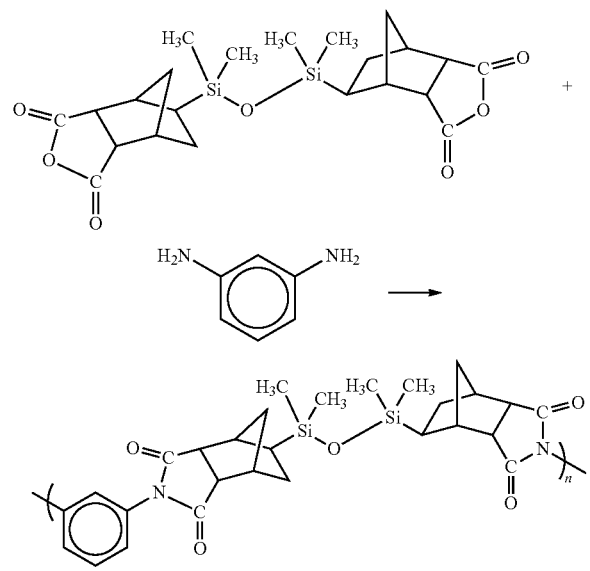

and that a polyimide resin having the same repeating units as those of the polyimide resin synthesized according to chemical equation (1) is synthesized according to chemical equation (2):

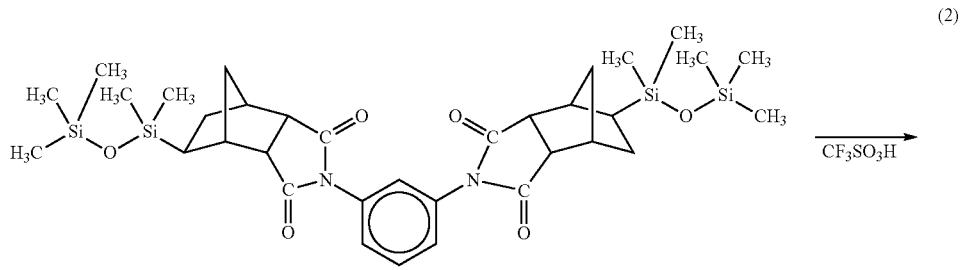

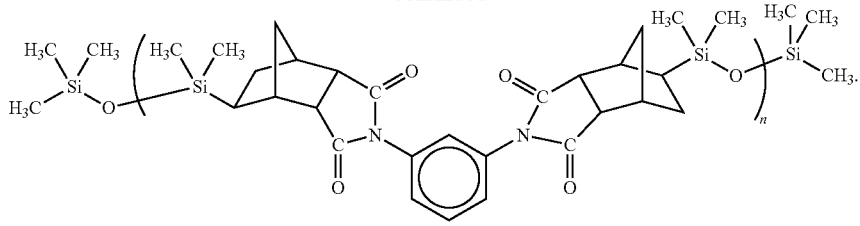

Non-Patent Document 2 reports that the synthesis according to chemical equation (1) provides the polyimide resin having a lower molecular weight than that of the polyimide resin synthesized according to chemical equation (2) and forms a cyclic oligomer, and further reports that a polyimide resin having an exo norbornane structure which is synthesized by a method similar to chemical equation (2) has a high intrinsic viscosity and the amount of a cyclic oligomer produced is small. The repeating unit of the polyimide resin synthesized according to chemical equation (3):

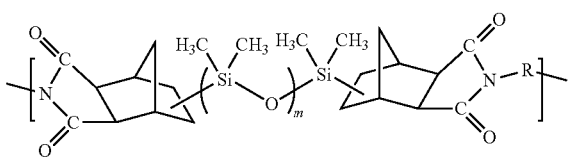

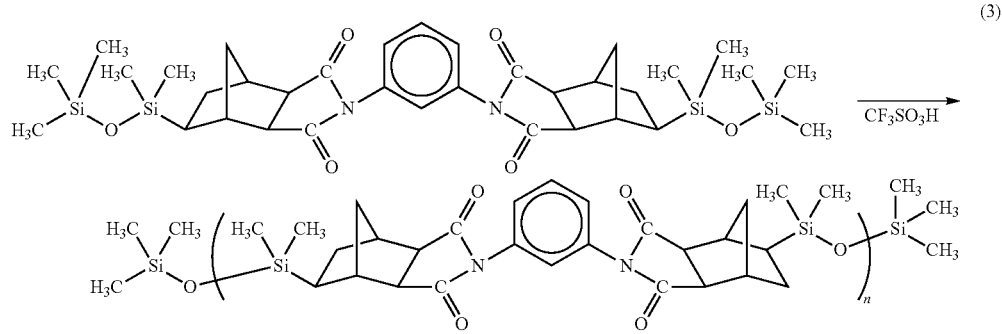

is structurally the same as that of the polyimide resin synthesized from the tetracarboxylic dianhydride represented by formula (6) and m-phenylenediamine.

However, in the method of synthesizing the polyimide resin according to chemical equation (3), the precursor is difficult to synthesize and purify and its structure available is limited. The merits of the polyimide resins are that they can be synthesized using a combination of various tetracarboxylic dianhydrides and various diamines according to their use and required properties and that their properties can by improved by copolymerizing a different kind of tetracarboxylic dianhydride or diamine. However, the method of chemical equation (3) fails to have such flexibility. Also, since a half amount of pentamethyldisiloxane in the precursor is eliminated during polymerization, the method of chemical equation (3) cannot be a synthesizing method of polyimide resin applicable to industrial production.

An object of the present invention is to provide a polyimide resin, which is soluble in general-purpose solvents, has a good transparency and a high molecular weight, and is excellent in mechanical properties, such as tensile strength and elongation, by using a tetracarboxylic dianhydride having an exo-form norbornanecarboxylic anhydride moiety at each terminal end, and further provide a polyamic acid resin as a precursor of the polyimide resin.

Thus, the present invention provides a polyimide resin comprising repeating units represented by formula (1);

wherein R is a diamine residue or a diisocyanate residue; m is an integer of 2 to 30; any of silicon atoms bonded to norbornane rings is in exo configuration with respect to the norbornane rings; and any of imide rings bonded to the norbornane rings is in exo configuration with respect to the norbornane rings, the polyimide resin being synthesized from a tetracarboxylic dianhydride represented by formula (3):

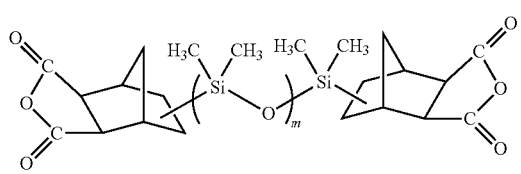

wherein m is an integer of 2 to 30; any of silicon atoms bonded to norbornane rings is in exo configuration with respect to the norbornane rings; and any of acid anhydride groups bonded to the norbornane rings is in exo configuration with respect to the norbornane rings.

The present invention further provides a polyamic acid resin as a precursor of the polyimide resin, which comprises repeating units represented by formula (2):

(2)

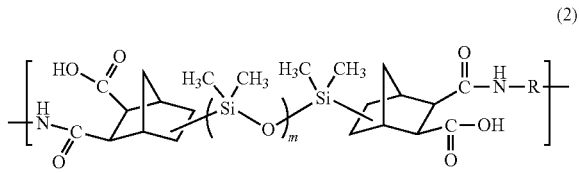

wherein R is a diamine residue; m is an integer of 2 to 30; any of silicon atoms bonded to norbornane rings is in exo configuration with respect to the norbornane rings; and any of amide groups and carboxyl groups bonded to the norbornane rings is in exo configuration with respect to the norbornane rings.

In accordance with the present invention, a polyimide resin which has a good transparency and a high molecular weight and is excellent in mechanical properties, such as tensile strength and elongation, and well soluble in general-purpose solvents, and a polyamic acid resin as a precursor of the polyimide resin are provided.

PREFERRED EMBODIMENTS FOR CARRYING OUT THE INVENTION

Figure 1:
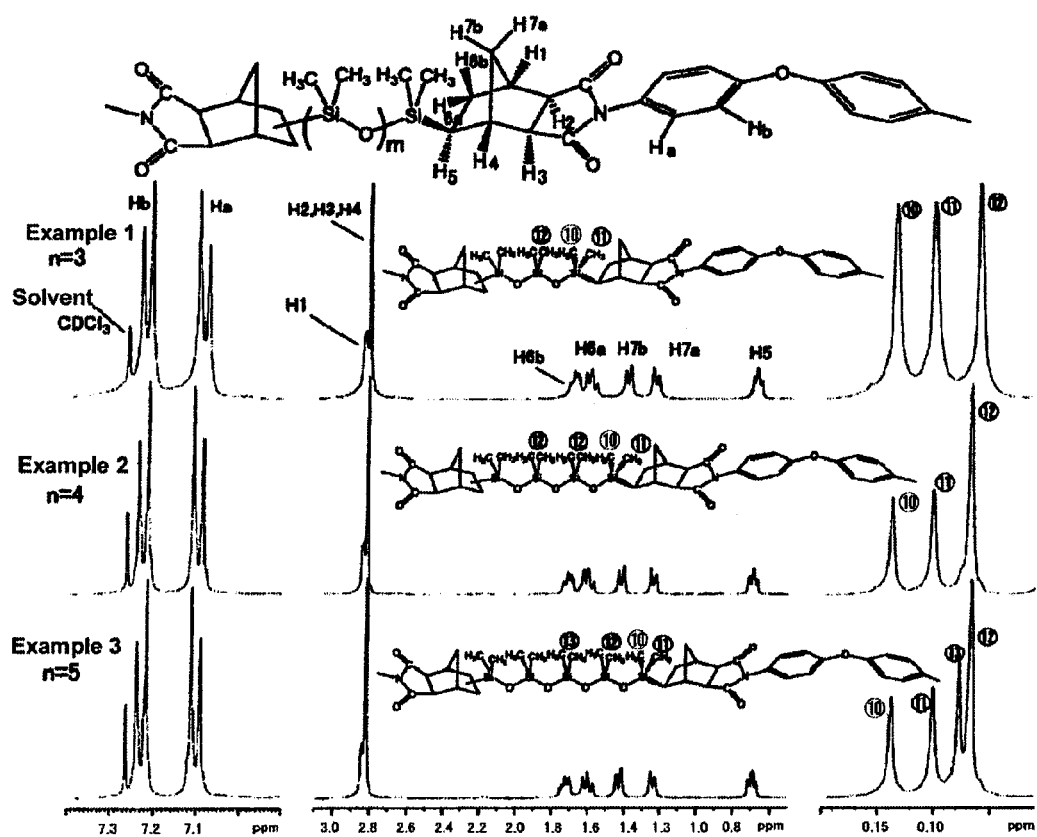
FIG. 1 shows ¹H-NMR spectra of polyimide resins obtained in Examples 1, 2 and 3.

The preferred embodiments of the present invention will be described in detail below, although the present invention is not particularly limited thereto.

In an embodiment of the invention, the polyimide resin comprises repeating units represented by formula (1):

(1)

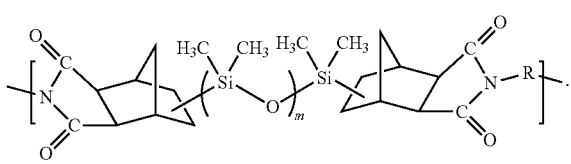

In the polyimide resin, any of silicon atoms bonded to norbornane rings is in exo configuration with respect to the norbornane rings, and any of imide rings bonded to the norbornane ring is in exo configuration with respect to the norbornane rings. In formula (1), m is an integer of from 2 to 30, preferably from 2 to 10 and more preferably from 2 to 5. The integers m in the repeating units may be all the same or different from each other. R represents a residue of diamine or diisocyanate each being used for synthesizing the polyimide resin.

In an embodiment of the invention, the polyimide resin may be also synthesized by the cyclodehydration of a polyamic acid resin comprising repeating units represented by formula (2):

(2)

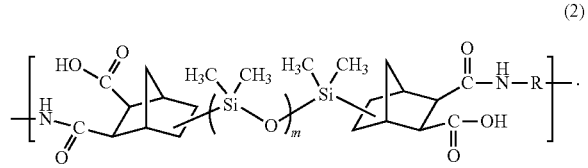

In the polyamic acid resin, any of silicon atoms bonded to norbornane rings is in exo configuration with respect to the norbornane rings, and any of amide groups and carboxyl groups bonded to the norbornane ring is in exo configuration with respect to the norbornane rings. In formula (2), m is an integer of from 2 to 30, preferably from 2 to 10 and more preferably from 2 to 5. The integers m in the repeating units may be all the same or different from each other. R represents a residue of diamine used for synthesizing the polyamic acid resin.

In an embodiment of the invention, the tetracarboxylic dianhydride raw material for synthesizing the polyimide resin and the polyamic acid resin is represented by formula (3):

(3)

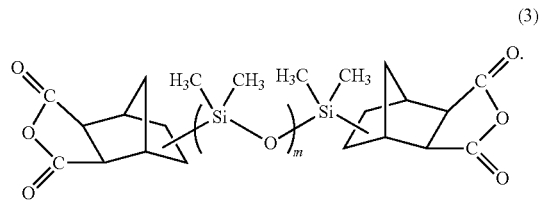

In the tetracarboxylic dianhydride, any of silicon atoms bonded to norbornane rings is in exo configuration with respect to the norbornane rings, and any of acid anhydride groups bonded to the norbornane ring is in exo configuration with respect to the norbornane rings. In formula (3), m is an integer of from 2 to 30, preferably from 2 to 10 and more preferably from 2 to 5. The tetracarboxylic dianhydride to be used may be a single tetracarboxylic dianhydride wherein the integers m are all the same or a mixture of tetracarboxylic dianhydrides having different integers m.

The tetracarboxylic dianhydride may be produced by a method including the hydrosililation of 5-norbornene-exo-2,3-dicarboxylic anhydride represented by formula (8):

(8)

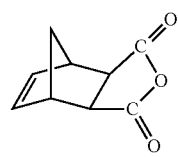

with a dimethylsiloxane compound terminated at each end with a hydrosilyl group represented by formula (9):

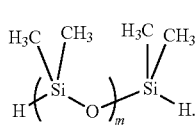
(9)

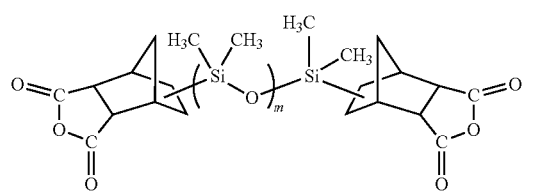
(10)

The hydrosilylation is well known in the art, and the conditions of the hydrosilylation can be readily selected by those skilled in the art. Therefore, details of the hydrosilylation are omitted here.

In formula (9), m is an integer of from 2 to 30, preferably from 2 to 10 and more preferably from 2 to 5. The dimethylsiloxane compound terminated at each end with a hydrosilyl group may be a single dimethylsiloxane compound of the same integer m or a mixture of dimethylsiloxane compounds having different integers m.

The tetracarboxylic dianhydride represented by formula (3) is a mixture of isomers each being represented by formulae (3a), (3b) and (3c):

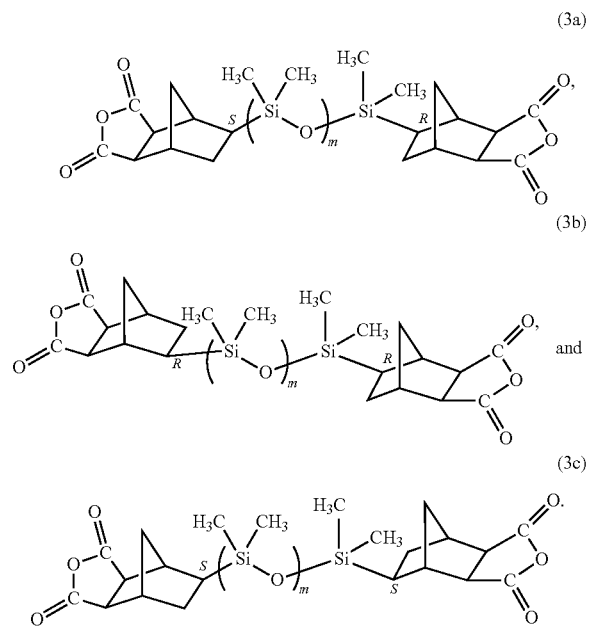

In the tetracarboxylic dianhydride represented by formula (3a), two terminal silicon atoms bond to the norbornane rings in exo configurations, i.e., one in R configuration and the other in S configuration according to the stereochemical description.

In the tetracarboxylic dianhydride represented by formula (3b), two terminal silicon atoms bond to the norbornane rings in exo configurations, i.e., both in R configurations according to the stereochemical description.

In the tetracarboxylic dianhydride represented by (3c), two terminal silicon atoms bond to the norbornane rings in exo configurations, i.e., both in S configurations according to the stereochemical description.

When 5-norbonene-endo-2,3-dicarboxylic anhydride is hydrosilylated with the dimethylsiloxane compound terminated at each end with a hydrosilyl group, a tetracarboxylic dianhydride represented by formula (10):

is obtained.

The tetracarboxylic dianhydride represented by formula (10) is also a mixture of stereoisomers: R—S isomer, R—R isomer and S—S isomer. At least the tetracarboxylic dianhydride of formula (10) wherein m is 2, 3 or 4 is crystallized at ordinary temperature. In contrast, even two years after the synthesis, the tetracarboxylic dianhydride represented by formula (3) of the invention still remains in liquid state at ordinary temperature.

Examples of the optional tetracarboxylic dianhydride to be copolymerized with the tetracarboxylic dianhydride represented by formula (3) include aromatic tetracarboxylic dianhydrides and alicyclic tetracarboxylic dianhydrides. The ultraviolet-visible absorption spectrum of the resultant copolymerized polyimide varies depending upon the structure of the optional tetracarboxylic dianhydride and the kind of diamine used. The optional tetracarboxylic dianhydride may be used in an amount of 50 mol % or less of the total amount of the tetracarboxylic dianhydride.

Examples of the aromatic tetracarboxylic dianhydrides include pyromellitic dianhydride, naphthalenetetracarboxylic dianhydride, and tetracarboxylic dianhydrides represented by formula (11):

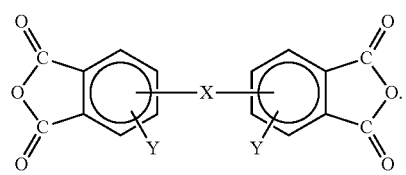
(11)

In formula (11), X is selected from the members recited in formula (12):

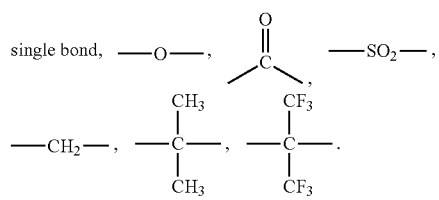
(12)

In formula (11), Y is selected from the members recited in formula (13):

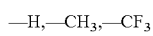
(13)

In formula (11), the positions of the benzene rings to which —X— and —Y bond are not particularly limited as long as the effects of the invention are not adversely affected.

Examples of the alicyclic tetracarboxylic dianhydride include the following compounds:

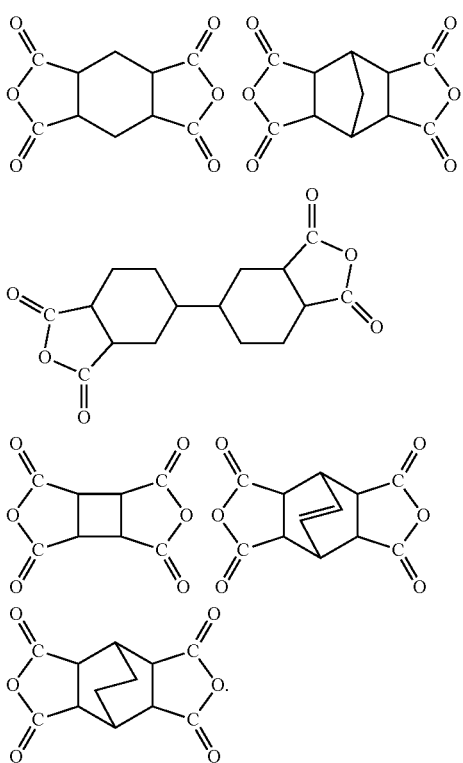

The absolute configuration of each anhydride group and the relative configuration between two anhydride groups are not particularly limited.

Examples of the diamine to be reacted with the tetracarboxylic dianhydride for producing the polyamic acid resin include various diamines, such as aromatic diamines and alicyclic diamines.

Examples of the aromatic diamine include a diamine represented by formula (14):

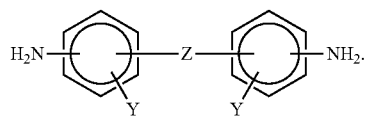

(14)

In formula (14), Z is selected from the members recited in formula (15):

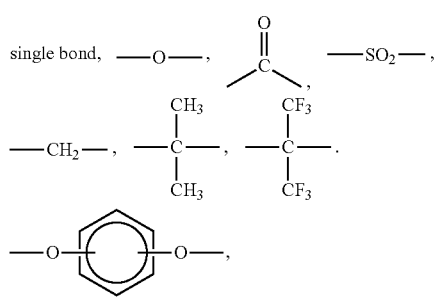

(15)

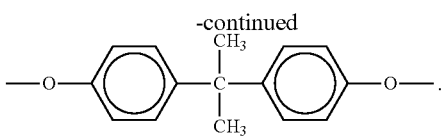

Y is selected from the members recited in formula (13).

In formula (14), the positions of the benzene rings to which —NH$_2$, —Y and —Z— bond are not particularly limited as long as the effects of the invention are not adversely affected.

Examples of the alicyclic diamine include the following compounds:

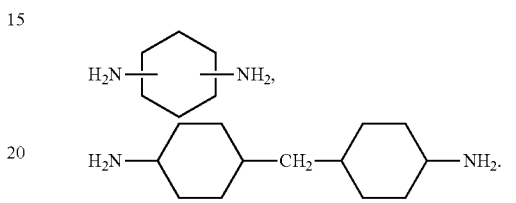

The polyimide resin of the invention is generally produced by a two-stage synthesis method comprising a step of synthesizing a polyamic acid resin from the tetracarboxylic dianhydride (the tetracarboxylic dianhydride of formula (3) and optionally the aromatic tetracarboxylic dianhydride and the alicyclic tetracarboxylic dianhydride) and the diamine, and a step of cyclodehydrating the resulting polyamic acid resin. Alternatively, the polyimide resin can be synthesized by a single-stage synthesis method by using a diisocyanate in place of the diamine. In the present invention, the reaction conditions of the two-stage synthesis method or the single-stage synthesis method may be selected from those employed in the conventionally known two-stage synthesis method and single-stage synthesis method except for using the tetracarboxylic dianhydride represented by formula (3). The preferred reaction methods are explained below.

The tetracarboxylic dianhydride and the diamine are preferably polymerized in nearly equimolar amount. Generally, the tetracarboxylic dianhydride is added to a solution of the diamine in a polar solvent, such as N-methyl-2-pyrrolidinone, N,N-dimethylacetamide, 1,2-dichlorobenzene, N-cydohexylpyrrolidone and m-cresol. Alternatively, both the starting materials can be charged at the same time before polymerization.

The total concentration of the tetracarboxylic dianhydride and the diamine in the reaction system is preferably from 10 to 30% by mass and more preferably from 15 to 20% by mass. When less than the above range, the degree of polymerization is not increased sufficiently. When higher than the above range, a problem, such as Weissenberg effect, may be caused.

The reaction between the tetracarboxylic dianhydride and the diamine is preferably carried out at a temperature of from room temperature (23° C.) to 100° C. for 0.5 to 5 h until the reaction solution becomes uniform and transparent. Generally, the polyamic acid resin is cyclodehydrated to the polyimide resin in the as-obtained liquid state. If necessary, the obtained reaction solution may be poured into water and the precipitated polyamic acid resin may be recovered.

The polyamic acid resin solution thus obtained or the separated polyamic acid resin is dissolved in the polar solvent mentioned above. Using the resulting solution, the polyamic acid resin is converted to the polyimide resin by the cyclodehydration. The concentration of the polyamic acid resin in the solution is preferably from 5 to 50% by mass and more preferably from 10 to 30% by mass, because the molecular weight of the polyimide resin to be obtained is sufficiently high and the solution is easily kept uniform by stirring.

The cyclodehydration is conducted by a heating method or a chemical method in the presence of a dehydrating agent, such as acetic anhydride, and a catalyst, such as pyridine. In another preferred method, the polyimide resin is produced by heating a solution of the polyamic acid resin in a high-boiling point solvent which forms an azeotrope with water, such as 1,2-dichlorobenzene, N-cyclohexylpyrrolidone and m-cresol, and then azeotropically removing the water eliminated during the cyclization and the solvent out of the reaction system.

The temperature for the cyclodehydration is preferably equal to the boiling point of the solvent. When using 1,2-dichlorobenzene, the temperature is 179° C. equal to the boiling point of 1,2-dichlorobenzene. When using m-cresol, the temperature is 203° C. equal to the boiling point of m-cresol. The reaction time is preferably from 3 to 8 h. If the reaction time is shorter than the above range, the cyclodehydration may be not completed to adversely affect the properties of the resulting polyimide resin.

The cyclodehydration is preferably carried out in the presence of a catalyst, such as benzoic acid, p-hydroxybenzoic acid, isoquinoline and 2-hydroxypyridine, because the reaction proceeds rapidly. The catalyst is preferably used in an amount of from 1 to 5% by mass of the total amount of the tetracarboxylic dianhydride and the diamine.

The polyimide resin can be synthesized by a single-stage reaction from the tetracarboxylic dianhydride and a diisocyanate in place of the diamine. By heating the diisocyanate, such as 4,4'-methylene-di(phenyl isocyanate) and 2,4-tolylene diisocyanate, together with the tetracarboxylic dianhydride at about 130° C. in the polar solvent mentioned above, such as N,N-dimethylacetamide, the polyimide resin is produced while eliminating carbon dioxide. The reaction between the tetracarboxylic dianhydride and the diisocyanate is well known in the art, and a person skilled in the art can easily select the reaction conditions. Therefore, details of the reaction conditions are omitted here.

The weight-average molecular weight of each of the polyimide resin represented by formula (1) and the polyamic acid resin represented by formula (2) is preferably from 30,000 to 200,000, more preferably from 50,000 to 180,000 and especially preferably from 80,000 to 160,000 from the viewpoints of mechanical properties of film, in particular, its elongation and the viscosity of a varnish. The ratio between the weight-average molecular weight and the number-average molecular weight of the resin, i.e., the dispersity index, is preferably from 1.3 to 3.0, more preferably from 1.3 to 2.0 and especially preferably from 1.3 to 1.6. The weight-average molecular weight and the number-average molecular weight are determined from the values measured by gel permeation chromatography (GPC) using a calibration curve of a standard polystyrene.

EXAMPLES

The present invention is described in more detail by referring to examples. However, it should be noted that these examples are only illustrative and not intended to limit the invention thereto.

Measuring Conditions of Viscosity of Tetracarboxylic Dianhydride

The measuring conditions of the viscosity of the tetracarboxylic dianhydrides used in examples are shown below.

Apparatus: EH type Viscometer available from Tokyo Keiki Co., Ltd.
    Measuring range: from 0.0512 to 102.4 Pa·s
    Measuring temperature: 25° C. or 40° C.

Measuring Conditions of Refractive Index of Tetracarboxylic Dianhydride

The measuring conditions of the refractive index of the tetracarboxylic dianhydrides used in examples are shown below.

Apparatus: DR-S1 type Abbe Refractometer available from Atago Co., Ltd.
    Measuring temperature: 25° C.

Measuring Conditions of Melting Point of Tetracarboxylic Dianhydride

The measuring conditions of the melting point of the tetracarboxylic dianhydrides used in examples are shown below.

Apparatus: Precision Micro Melting Point Measuring Apparatus available from Ishii Shoten Co., Ltd.
    Capillary tube: One end-sealed type; inner diameter: 1.05 mm; outer diameter: 1.55 mm
    Temperature rise rate: 2° C./min GPC Measuring Conditions of Tetracarboxylic Dianhydride The measuring conditions of GPC for purity of the tetracarboxylic dianhydrides used in examples are shown below.

Column: two pieces of Gelpack GL-A110 (500 mm in length and available from Hitachi Chemical Co., Ltd.) connected in series.
    Eluent tetrahydrofuran
    Flow rate: 1.0 mL/min
    Detector: L-3300RI Type Differential Refractometer available from Hitachi Ltd.
    Measuring temperature: 25° C.

GPC Measuring Conditions of Polyimide Resin

The measuring conditions of GPC for the molecular weight of the polyimide resin used in examples are shown below.

Column: Gelpack GL-R440, Gelpack GL-R450 and Gelpack GL-400M (all available from Hitachi Chemical Co., Ltd.) connected in series.
    Eluent: tetrahydrofuran
    Flow rate: 2.05 mL/min
    Detector: L-3300RI Type Differential Refractometer available from Hitachi Ltd.
    Measuring temperature: 25° C.

NMR Measuring Conditions

The NMR measuring conditions for determining the average number of silicon atoms in the tetracarboxylic dianhydrides in examples and identifying the structure of the polyimide resins in examples are shown below.

Apparatus: AV400M Model Superconducting Fourier-Transform Nuclear Magnetic Resonance System available from Bruker Co. Ltd.
    Resonance frequency: $^1$H-NMR 400.23 MHz
    Solvent: heavy chloroform
    Sample concentration: 15 mg/0.75 mL
    Measuring temperature: room temperature (24° C.)
    Number of scan: 16

Measuring Conditions (1) of Glass Transition Point of Polyimide Resin

The measuring conditions of the glass transition point of the polyimide resins in examples are shown below.

Apparatus: TMA/SS-6200 Model Thermomechanical Analyzer available from Seiko Instruments Inc.
    Measuring method: under tension with a load of 5 g
    Shape of sample: 10.0 mm long, 2.0 mm wide, and 20 to 25 μm thick
    Temperature rise rate: 10° C./min
    Atmosphere: air Measuring Conditions (2) of Glass Transition Point of Polyimide Resin The measuring conditions of the glass transition point of the polyimide resins in comparative examples are shown below.
Apparatus: DSC-6200 Model Differential Scanning Calorimeter available from Seiko Instruments Inc.
Amount of sample: 10 mg
Temperature rise rate: 10° C./min
Atmosphere: air Measuring Conditions of Mechanical Properties of Polyimide Resin The measuring conditions of the tensile test for evaluating mechanical properties (tensile strength, elastic modulus and elongation at break) of the polyimide resins obtained in examples are shown below.
Apparatus: AGS-5KNG Model Autograph available from Shimadzu Corporation
Shape of test piece: 20 to 25 μm thick and 10.0 mm wide
Chuck interval: 20.0 mm
Tensile speed: 5 mm/min
Measuring temperature: 23° C.

Measuring Conditions of Transmittance of Polyimide Resin

The measuring conditions of the transmittance of the polyimide resins in examples are shown below.
Apparatus: U-3310 Model Ultraviolet-Visible Spectrophotometer available from Hitachi Ltd.
Scanning speed: 300 nm/min Measuring Conditions of Thermogravimetric Analysis of Polyimide Resin The measuring conditions of thermogravimetric analysis of the polyimide resins in examples are shown below.
Apparatus: TG/DTA-6200 Model Simultaneous Thermogravimetry/Differential Thermal Analyzer available from Seiko Instruments Inc.
Amount of sample: 10 mg
Temperature rise rate: 10° C./min
Atmosphere: air, 10 mL/min Measuring Conditions of FT-IR of Polyimide Resin and Polyamic Acid Resin
Apparatus: 3100 Model Fourier-Transform Infrared Spectrophotometer available from Varian Inc.
Measuring method: KBr method Synthesis Example 1

Synthesis of Tetracarboxylic Dianhydride of Formula (3) Wherein m is 2

A 300-mL four-necked flask equipped with a stirrer, a dropping funnel, a cooling tube and a thermometer was charged with 115 g of toluene and 49.50 g (0.3015 mol) of 5-norbornene-exo-2,3-dicarboxylic anhydride having a melting point of from 148 to 149.5° C., and the stirring of the contents was started under heating. When the temperature inside the flask reached 65° C., 1.184 g ($1.214 \times 10^{-4}$ gram atom of metallic platinum) of platinum(0)-1,3-divinyl-1,1,3,3-tetramethyldisiloxane complex (a xylene solution having a platinum concentration of 2%) available from Aldrich Co. was added as a catalyst, and then 31.27 g (0.1500 mol) of 1,1,3,3,5,5-hexamethyltrisiloxane was gradually added dropwise from the dropping funnel. The reaction temperature was raised as the dropwise addition proceeded. Therefore, the dropwise addition was conducted over 1 h while taking a care to maintain the temperature inside the flask at 70° C. Thereafter, the reaction was allowed to further proceed for 1 h while maintaining the temperature inside the flask at 70° C.

After cooling, 8 g of activated carbon was added, the mixture was stirred for 30 min at room temperature, and then the activated carbon was removed by filtration. The obtained filtrate was concentrated under reduced pressure using a rotary evaporator, and then a small amount of nitrogen was blown into the filtrate under a reduced pressure of 70 Pa to remove a trace amount of residual 5-norbornene-exo-2,3-dicarboxylic anhydride.

Thus, the titled tetracarboxylic dianhydride, i.e., 5,5'-exo-(1,1,3,3,5,5-hexamethyltrisiloxane-1,5-diyl)bisbicyclo[2.2.1]heptane-exo-2,3-dicarboxylic anhydride (exo-NB-TriSXDA) was obtained. The purity determined by GPC analysis was 99.5% and the viscosity was 38.4 Pa·s when measured at 40° C.

Synthesis Example 2

Synthesis of Tetracarboxylic Dianhydride of Formula (3) Wherein m is 3

The reaction and after-treatments were carried out in the same manner as in Synthesis Example 1 except that the amounts of 5-norbornene-exo-2,3-dicarboxylic anhydride and the catalyst were changed to 39.61 g (0.2413 mol) and 0.9516 g, respectively, and 33.93 g (0.1201 mol) of 1,1,3,3,5,5,7,7-octamethyltetrasiloxane were used in place of 1,1,3,3,5,5-hexamethyltrisiloxane.

Thus, the titled tetracarboxylic dianhydride, i.e., 5,5'-exo-(1,1,3,3,5,5,7,7-octamethyltrisiloxane-1,7-diyl)bisbicyclo[2.2.1]heptane-exo-2,3-dicarboxylic anhydride (exo-NB-TetraSXDA) was obtained. The purity determined by GPC analysis was 98.7%, the viscosity was 22.5 Pa·s when measured at 25° C., and the refractive index was 1.4825.

Synthesis Example 3

Synthesis of Tetracarboxylic Dianhydride of Formula (3) Wherein m is 4

The reaction and after-treatments were carried out in the same manner as in Synthesis Example 1 except that the amounts of 5-norbornene-exo-2,3-dicarboxylic anhydride and the catalyst were changed to 41.26 g (0.2513 mol) and 0.9745 g, respectively, and 44.59 g (0.1250 mol) of 1,1,3,3,5,5,7,7,9,9-decamethylpentasiloxane was used in place of 1,1,3,3,5,5-hexamethyltrisiloxane.

Thus, the titled tetracarboxylic dianhydride, i.e., 5,5'-exo-(1,1,3,3,5,5,7,7,9,9-decamethylpentasiloxane-1,9-diyl)bisbicyclo[2.2.1]heptane-anhydride (exo-NB-PentaSXDA) was obtained.

The purity determined by GPC analysis was 99.7%, the viscosity was 5.84 Pa·s when measured at 25° C., and the refractive index was 1.4735.

Synthesis Example 4

Synthesis of Mixed Tetracarboxylic Dianhydride of Formula (3) Wherein m is from 2 to 10 and 4.11 in Average The reaction and after-treatments were carried out in the same manner as in Synthesis Example 1 except that the amounts of 5-norbornene-exo-2,3-dicarboxylic anhydride and the catalyst were changed to 39.61 g (0.2413 mol) and 0.9480 g, respectively, and a mixed oligomer of dimethylsiloxane terminated at each end with a hydrosilyl group was used in place of 1,1,3,3,5,5-hexamethyltrisiloxane. The number (n) of silicon atoms (m+1 in formula (3)) of the mixed oligomer distributed from 3 to 11. The mixed oligomer was used in an amount of 49.90 g (0.1193 mol excluding the amount (10.8%) of a cyclic oligomer which was included in the mixed oligomer and did not contribute to hydrosilylation).

The average number (n) of silicon atoms was determined by $^1$H-NMR spectrum and the obtained compound was indentified as the titled tetracarboxylic dianhydride (exo-NB-MixSXDA). The purity determined by GPC analysis was 99.8%, the viscosity was 4.11 Pa·s when measured at 25° C., and the refractive index was 1.4706.

Synthesis Example 5

Synthesis of Meso Isomer of Tetracarboxylic Dianhydride of Formula (5)

A 1-L four-necked flask equipped with a stirrer, a dropping funnel, a cooling tube and a thermometer was charged with 200 g of toluene and 82.08 g (0.5000 mol) of 5-norbornene-endo-2,3-dicarboxylic anhydride having a melting point of from 166 to 167° C., and the stirring of the contents was started under heating. When the temperature inside the flask reached 95° C., 6.4731 g (6.64×10$^{-4}$ gram atom of metallic platinum) of platinum(0)-1,3-divinyl-1,1,3,3-tetramethyldisiloxane complex (a xylene solution having a platinum concentration of 2%) available from Aldrich Co. was added as a catalyst, and 52.12 g (0.2500 mol) of 1,1,3,3,5,5-hexamethyl trisiloxane was gradually added dropwise from the dropping funnel. The reaction temperature was raised as the dropwise addition proceeded. Therefore, the dropwise addition was conducted over 1 h while taking a care to maintain the temperature inside the flask at 100° C. Then, the reaction was allowed to further proceed for 4 h while maintaining the temperature inside the flask at 100° C.

After cooling to 50° C., 12 g of activated carbon was added, the mixture was stirred for 30 min at room temperature, and then the activated carbon was removed by filtration. A trace amount of a seed crystal (crystal separately prepared having a melting point of from 141.5 to 142.5° C.) was added to the obtained filtrate to cause crystallization. After allowing the resulting mixture to stand overnight, fine crystals were precipitated. The crystals were collected by filtration and dried by hot air. The filtrate was stored because it contained the racemic mixture. Since the melting point of the obtained crystals was as low as from 136 to 140° C., the crystals were recrystallized from toluene to obtain crystals having a melting point of from 143 to 144° C. The purity of the crystals was 99.6% when determined by GPC analysis.

$^1$H-NMR spectrum showed that the peak attributable to two methyl groups on the central silicon atom of the trisiloxane moiety was split into two peaks (0.036 ppm and 0.038 ppm). From this result, the obtained compound was indentified as a meso isomer (endo-NB-TriSXDA meso isomer) having the following molecular structure (5a):

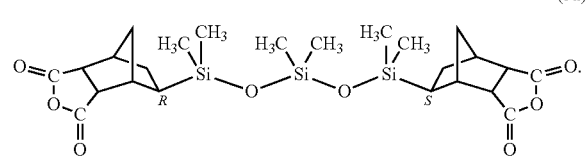

(5a)

The chemical name of the meso isomer is (5R,5'S)-5,5'-exo-(1,1,3,3,5,5-hexamethyltrisiloxane-1,5-diyl)bisbicyclo[2.2.1]heptane-endo-2,3-dicarboxylic anhydride.

Synthesis Example 6

Synthesis of Racemic Mixture of Tetracarboxylic Dianhydride of Formula (5)

The filtrate stored in Synthesis Example 5 contained a racemic mixture of the tetracarboxylic dianhydride represented by formula (5) in addition to the remaining meso isomer. Further, GPC analysis showed that unreacted 5-norbornene-endo-2,3-dicarboxylic anhydride and a small amount of unknown compounds were contained in the filtrate.

After removing toluene using a rotary evaporator, the residue was recrystallized from diethyl ether to obtain crystals having a melting point of from 104 to 114° C. GPC analysis showed that the unreacted 5-norbornene-endo-2,3-dicarboxylic anhydride and a small amount of the unknown compounds were removed.

The resulting crystals were further recrystallized from a mixed solvent of 75% by mass of toluene and 25% by mass of hexane to obtain crystals of meso isomer having a melting point of from 136 to 139° C. Then, hexane was added to the filtrate such that the resultant filtrate contained 50% by mass of toluene and 50% by mass of hexane to cause crystallization. Since the melting point was from 113 to 118° C., the obtained crystals were recrystallized from a mixed solvent of 50% by mass of toluene and 50% by mass of hexane to obtain crystals having a melting point of from 117 to 120° C. The purity of the obtained crystals was 98.4% when determined by GPC analysis. The X-ray structural analysis conducted according to JP 2010-254602A showed that the obtained compound was a racemic mixture (endo-NB-TrisSXDA racemic mixture) containing a pair of R—R isomer represented by molecular structure (5b) and S—S isomer represented by molecular structure (5c) in a unit cell.

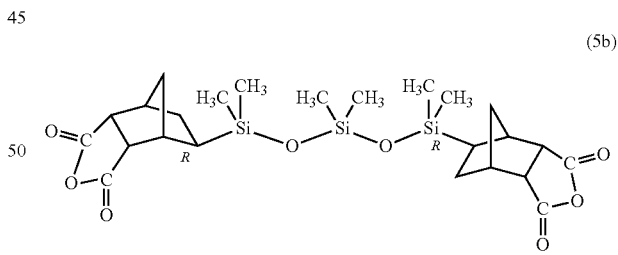

(5b)

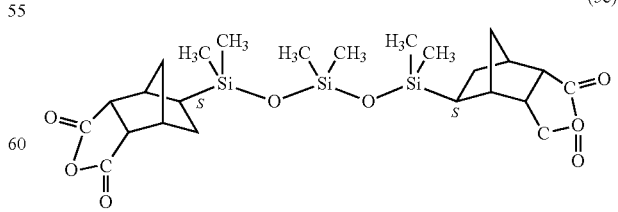

(5c)

The chemical name of the racemic is (5R,5'R)- and (5S,5'S)-5,5'-exo-(1,1,3,3,5,5-hexamethyltrisiloxane-1,5-diyl)bisbicyclo[2.2.1]heptane-endo-2,3-dicarboxylic anhydride.

Synthesis Example 7

Synthesis of Tetracarboxylic Dianhydride of Formula (6)

A 1-L four-necked flask equipped with a stirrer, a dropping funnel, a cooling tube and a thermometer was charged with 240 g of toluene and 123.20 g (0.7505 mol) of 5-norbornene-exo-2,3-dicarboxylic anhydride having a melting point of from 148 to 149.5° C., and the stirring of the contents was started under heating. When the temperature inside the flask reached 80° C., 2.99 g ($3.07 \times 10^{-4}$ gram atom of metallic platinum) of platinum(0)-1,3-divinyl-1,1,3,3-tetramethyldisiloxane complex (a xylene solution having a platinum concentration of 2%) available from Aldrich Co. was added as a catalyst, and 50.17 g (0.3735 mol) of 1,1,3,3-tetramethyldisiloxane was gradually added dropwise from the dropping funnel. The reaction temperature was raised as the dropwise addition proceeded. Therefore, the dropwise addition was conducted over 1 h while taking a care to maintain the temperature inside the flask at 90° C. Then, the reaction was allowed to further proceed for 1 h while maintaining the temperature inside the flask at 90° C.

After cooling, 15 g of activated carbon was added, the mixture was stirred for 2 h at room temperature, and then the activated carbon was removed by filtration. The obtained colorless transparent filtrate was concentrated under vacuum while heating by using a rotary evaporator, thereby obtaining 166.4 g of a viscous colorless transparent liquid. GPC analysis showed that the toluene used as the solvent did not remain in the obtained liquid.

The obtained liquid was purified by extraction to remove a compound represented by formula (16a) which was a by-product specific to the reaction using 1,1,3,3-tetramethyldisiloxane. Specifically, 86.8 g of the viscous colorless transparent liquid, 169.4 g of hexane and 23.9 g of toluene were charged into an extraction-side flask of a continuous simple extraction apparatus, 101.3 g of hexane were charged into a distillation-side flask, and 60.0 g of hexane were charged into a dropping funnel. The extraction was conducted over 10 h while setting an extraction-side water bath at 65° C. and a distillation-side oil bath at 115° C. The lower layer in the extraction-side flask was recovered and the solvent was removed to obtain 62.0 g of a residue. Then, another by-product represented by formula (16b) was removed by distillation under a reduced pressure of 70 Pa while blowing a small amount of nitrogen.

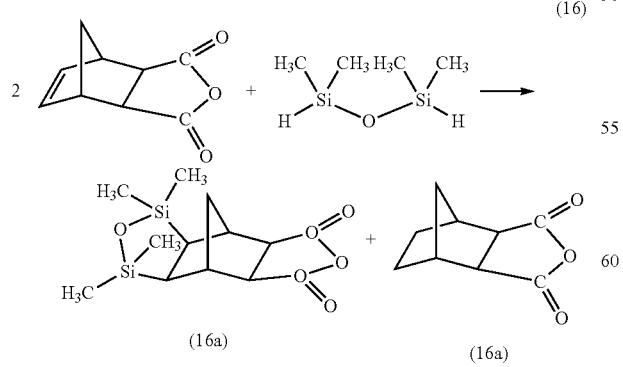

Thus, 5,5'-exo-(1,1,3,3-tetramethyl disiloxane-1,3-diyl) bisbicyclo[2.2.1]heptane-2,3-exo-dicarboxylic anhydride (exo-NB-DiSXDA) represented by formula (6) was obtained. The obtained compound was a viscous colorless transparent liquid having a purity of 98.3% when determined by GPC analysis and a viscosity of 2,960 Pa·s when measured at 40° C.

Synthesis Example 8

Synthesis of Tetracarboxylic Dianhydride of Formula (10) Wherein m is 3

A 300-mL four-necked flask equipped with a stirrer, a dropping funnel, a cooling tube and a thermometer was charged with 116 g of toluene and 60.12 g (0.3662 mol) of 5-norbornene-endo-2,3-dicarboxylic anhydride having a melting point of from 166 to 167° C., and the stirring of the contents was started under heating. When the temperature inside the flask reached 95° C., 2.58 g ($2.65 \times 10^{-4}$ gram atom of metallic platinum) of platinum(0)-1,3-divinyl-1,1,3,3-tetramethyldisiloxane complex (a xylene solution having a platinum concentration of 2%) available from Aldrich Co. was added as a catalyst, and 51.50 g (0.1822 mol) of 1,1,3,3,5,5,7,7-octamethyltetrasiloxane was gradually added dropwise from the dropping funnel. The reaction temperature was raised as the dropwise addition proceeded. Therefore, the dropwise addition was conducted over 1 h while taking a care to maintain the temperature inside the flask at 100° C. The sampled solution was analyzed by GPC. Subsequently, the reaction was allowed to proceed while maintaining the temperature inside the flask at 100° C., and the sampled solution was analyzed by GPC after 2 h of the initiation of reaction. GPC analysis showed that there was no change in the composition of the reaction solution. Therefore, 1.28 g of the additional catalyst was added after 3 h of the initiation of reaction. Thereafter, the reaction was continued while analyzing the sampled solutions, and the catalyst was further added 1.13 g after 5.5 h of the initiation of reaction and 1.12 g after 7.5 h of the initiation of reaction. After 9 h of the initiation of reaction, the remaining amount of 5-norbornene-endo-2,3-dicarboxylic anhydride reached 5.9% of the initial charge and the reaction was terminated. The total amount of the catalyst used in the reaction was 6.11 g ($6.26 \times 10^{-4}$ gram atom of metallic platinum).

After cooling to 50° C., 12 g of activated carbon was added, the mixture was stirred for 30 min at room temperature, and then the activated carbon was removed by filtration. By removing toluene from the obtained filtrate using a rotary evaporator, 89.05 g of white crystals having a melting point of from 87.5 to 94.5° C. was obtained. The obtained crystal was a mixture of a meso isomer and a racemic mixture (endo-NB-TetraSXDA) and the yield was 80.0%. Then, the crystals were recrystallized from a 2:1 by weight mixed solvent of toluene and hexane, thereby obtaining crystals having a melting point of from 99.0 to 100.0° C. The purity of the crystals determined by GPC analysis was 99.7%.

Example 1

Polyimide Resin Produced from exo-NB-TriSXDA of Synthesis Example 1 and Oxydianiline A polyimide resin was produced from the exo-NB-TriSXDA synthesized in Synthesis Example 1 in the following manner.

A 100-mL four-necked flask equipped with an agitation blade, a thermometer, a Dean-Stark fractional distillation tube and a nitrogen inlet tube was charged with 5.1812 g (9.651 mmol) of exo-NB-TriSXDA, 1.9328 g (9.652 mmol) of 4,4'-oxydianiline, 0.2220 g of 2-hydroxypyridine as a catalyst, and 50.38 g of 1,2-dichlorobenzene, and the stirring of the contents was started under heating.

After heating under stirring at 100° C. for 30 min, the reaction solution changed to a uniform transparent solution and then the temperature was raised to 179° C. (boiling point of 1,2-dichlorobenzene) over 30 min. The reaction was continued at the same temperature for 4 h. During the reaction, a white turbid mixture of 1,2-dichlorobenzene and water which was accumulated in an upper portion of the Dean-Stark fractional distillation tube was discharged and fresh 1,2-dichlorobenzene was added in the same amount as discharged.

After 4 h, the heating was stopped to cool the reaction solution. When the temperature inside the flask reached 65° C., 35 g of acetone was added. By pouring the resulting solution into 600 g of methanol in a beaker, a gummy mass was precipitated on the bottom of beaker. The precipitated mass was dissolved in 60 g of acetone and the acetone solution was poured into 600 g of fresh methanol. The gummy mass precipitated on the bottom of beaker was taken out and placed in a drying oven at 90° C. for 4 h to remove the solvent. The obtained resin was 5.51 g by mass and the yield was 81.4% of the theoretical yield based on the initial charge.

FIG. 1 shows a $^1$H-NMR spectrum of the obtained polyimide resin, which reflects the structure of repeating unit.

GPC analysis showed that the number-average molecular weight was 30,400 and the weight-average molecular weight was 56,200 when calibrated by a standard polystyrene.

The polyimide resin was examined for the solubility at room temperature by adding a solvent to accurately weighed about 50 mg of the polyimide resin in an amount 10 times the weight of the polyimide resin. The polyimide resin was dissolved in tetrahydrofuran, acetone, N-methyl-2-pyrrolidinone and N,N-dimethylacetamide, but formed a cloudy turbid liquid with toluene, which was separated into two layers after leaving it to stand.

The polyimide resin was formed into a film in the following manner to determine its properties.

A 25% by mass solution of the polyimide resin in N,N-dimethylacetamide was filtered through a filter paper No. 5B available from Toyo Roshi Kaisha, Ltd. The obtained filtrate was applied to a glass plate by casting in an amount corresponding to a dry thickness of from 20 to 30 μm and the coated glass plate was placed in a drying oven at 65° C. for 30 min. Then the temperature was raised to 165° C. over 20 min and held there for 15 min. The glass plate thus treated was immersed in warm water for 10 min and then the film was peeled from the glass plate.

Figure 2:
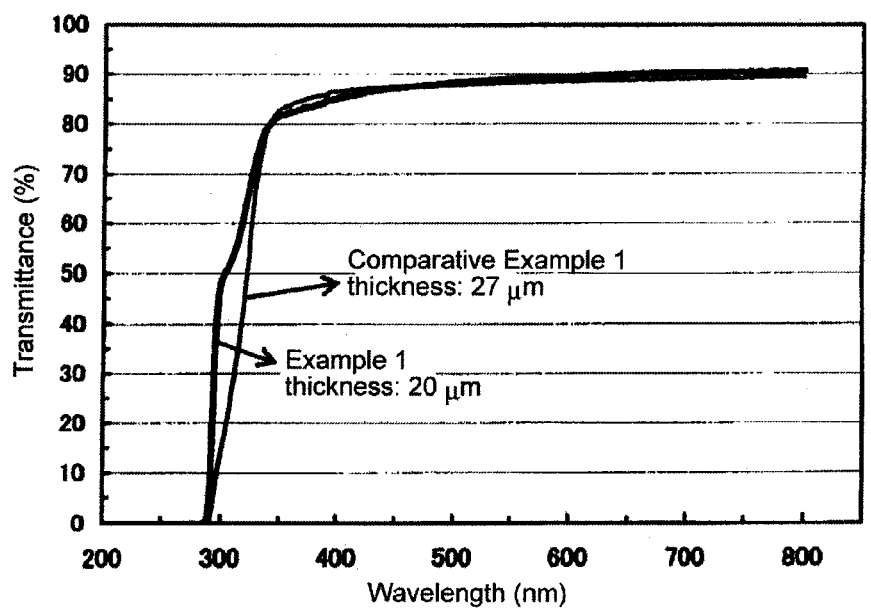
FIG. 2 shows ultraviolet-visible transmittance spectra of polyimide resins obtained in Example 1 and Comparative Example 1.
Figure 4:
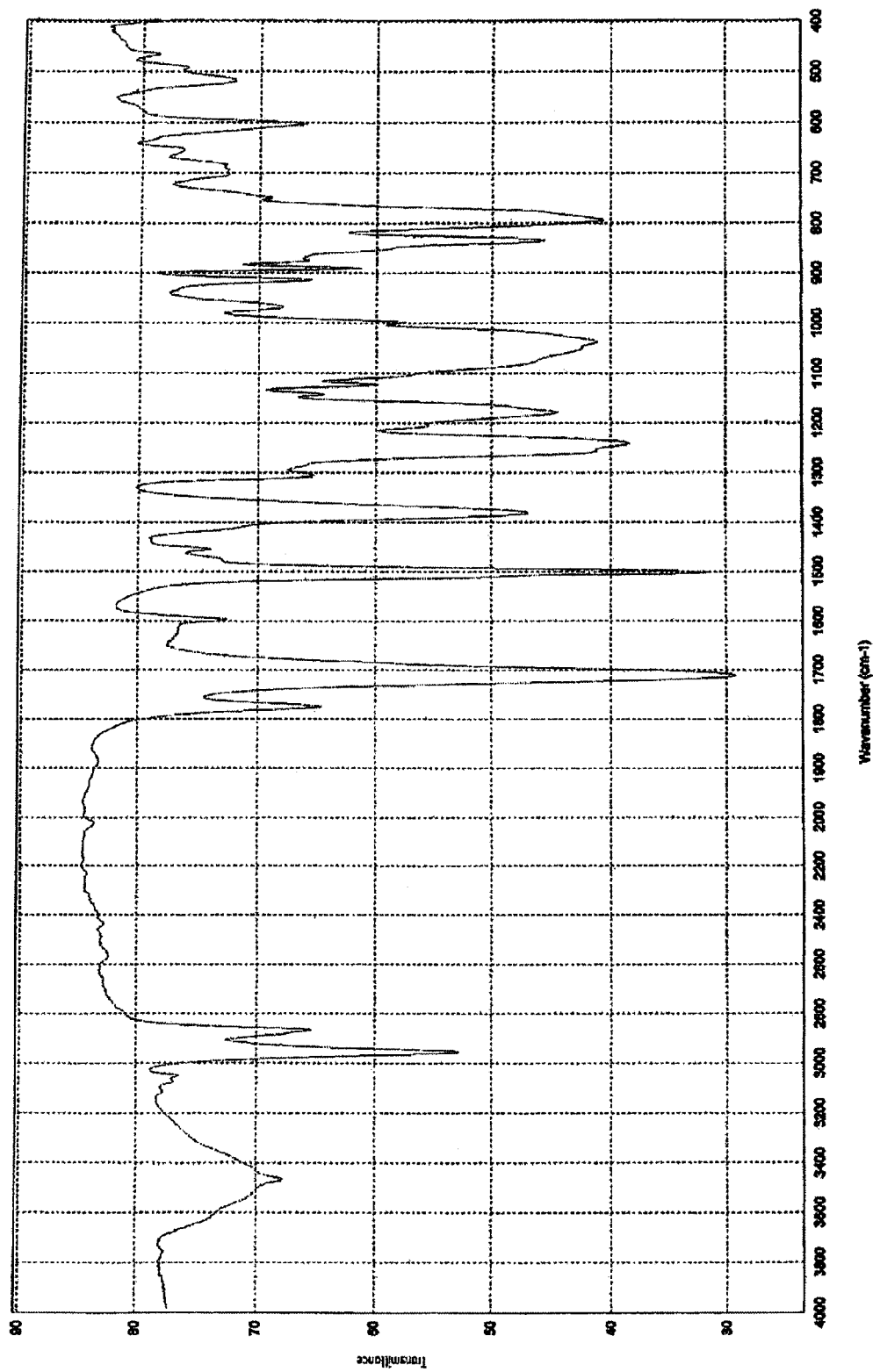
FIG. 4 shows FT-IR spectrum of a polyimide resin obtained in Example 1.

The obtained film was measured for the glass transition point under tension using a thermo-mechanical analyzer and tensile properties. The results are shown in Table 1. The transmittance spectrum by an ultraviolet-visible spectrophotometer is shown in FIG. 2, and the FT-IR spectrum by an infrared spectrophotometer is shown in FIG. 4.

Example 2

Polyimide Resin Produced from exo-NB-TetraSXDA of Synthesis Example 2 and Oxydianiline A polyimide resin was produced from exo-NB-TetraSXDA synthesized in Synthesis Example 2 in the following manner.

A 100-mL four-necked flask equipped with an agitation blade, a thermometer, a Dean-Stark fractional distillation tube and a nitrogen inlet tube was charged with 7.5602 g (7.4619 g (12.214 mmol) as pure product) of exo-NB-TetraSXDA, 2.4457 g (12.270 mmol) of 4,4'-oxydianiline, 0.2965 g of 2-hydroxypyridine as a catalyst, and 69.37 g of 1,2-dichlorobenzene. Subsequently, the reaction was carried out in the same manner as in Example 1, thereby precipitating a resin.

The obtained resin was 7.11 g by mass and the yield was 75.1% of the theoretical yield based on the initial charge.

FIG. 1 shows a $^1$H-NMR spectrum of the obtained polyimide resin, which reflects the structure of repeating unit.

GPC analysis showed that the number-average molecular weight was 40,500 and the weight-average molecular weight was 68,400 when calibrated by a standard polystyrene.

The polyimide resin was examined for the solubility in the same manner as in Example 1. The polyimide resin was dissolved in all of tetrahydrofuran, acetone, toluene, N-methyl-2-pyrrolidinone and N,N-dimethylacetamide to provide uniform transparent solutions.

The polyimide resin was formed into a film in the same manner as in Example 1, which was measured for the glass transition point and tensile properties. The results are shown in Table 1.

Example 3

Polyimide Resin Produced from exo-NB-PentaSXDA of Synthesis Example 3 and Oxydianiline A polyimide resin was produced from exo-NB-PentaSXDA synthesized in Synthesis Example 3 in the following manner.

A 100-mL four-necked flask equipped with an agitation blade, a thermometer, a Dean-Stark fractional distillation tube and a nitrogen inlet tube was charged with 6.6203 g (9.6633 mmol) of the exo-NB-PentaSXDA, 1.9349 g (9.6629 mmol) of 4,4'-oxydianiline, 0.2564 g of 2-hydroxypyridine as a catalyst, and 59.87 g of 1,2-dichlorobenzene. Subsequently, the reaction was carried out in the same manner as in Example 1, thereby precipitating a resin.

The obtained resin was 6.75 g by mass and the yield was 82.2% of the theoretical yield based on the initial charge.

FIG. 1 shows a $^1$H-NMR spectrum of the obtained polyimide resin, which reflects the structure of repeating unit.

GPC analysis showed that the number-average molecular weight was 59,900 and the weight-average molecular weight was 106,800 when calibrated by a standard polystyrene.

The polyimide resin was examined for the solubility in the same manner as in Example 1. The polyimide resin was dissolved in all of tetrahydrofuran, acetone, toluene, N-methyl-2-pyrrolidinone and N,N-dimethylacetamide to provide uniform transparent solutions.

The polyimide resin was formed into a film in the same manner as in Example 1, which was measured for the glass transition point and tensile properties. The results are shown in Table 1.

Example 4

Polyimide Resin Produced from exo-NB-MixSXDA of Synthesis Example 4 and Oxydianiline A polyimide resin was produced from exo-NB-MixSXDA synthesized in Synthesis Example 4 in the following manner.

A 100-mL four-necked flask equipped with an agitation blade, a thermometer, a Dean-Stark fractional distillation tube and a nitrogen inlet tube was charged with 6.9907 g (10.084 mmol) of exo-NB-MixSXDA, 2.0167 g (10.071 mmol) of 4,4'-oxydianiline, 0.2725 g of 2-hydroxypyridine as a catalyst, and 63.08 g of 1,2-dichlorobenzene. Subsequently, the reaction was carried out in the same manner as in Example 1, thereby precipitating a resin.

The obtained resin was 6.80 g by mass and the yield was 78.7% of the theoretical yield based on the initial charge.

Figure 3:
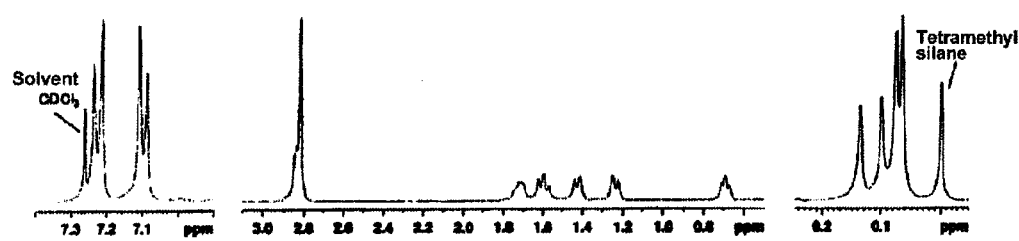
FIG. 3 shows ¹H-NMR spectrum of a polyimide resin obtained in Example 4.

FIG. 3 shows a $^1$H-NMR spectrum of the obtained polyimide resin, which reflects the structure of repeating unit.

GPC analysis showed that the number-average molecular weight was 31,900 and the weight-average molecular weight was 50,400 when calibrated by a standard polystyrene.

The polyimide resin was examined for the solubility in the same manner as in Example 1. The polyimide resin was dissolved in all of tetrahydrofuran, acetone, toluene, N-methyl-2-pyrrolidinone and N,N-dimethylacetamide to provide uniform transparent solutions.

The polyimide resin was formed into a film in the same manner as in Example 1, which was measured for the glass transition point and tensile properties. The results are shown in Table 1.

Example 5

Polyamic Acid Resin Produced from exo-NB-TriSXDA of Synthesis Example 1 and Oxydianiline A 100-mL four-necked flask equipped with an agitation blade, a thermometer and a nitrogen inlet tube was charged with 6.3208 g (11.775 mmol) of exo-NB-TriSXDA synthesized in Synthesis Example 1, 2.3577 g (11.774 mmol) of 4,4'-oxydianiline and 49.21 g of N-methyl-2-pyrrolidinone, and the stirring of the contents was started at room temperature (28° C.).

After 3 h, the resulting polyamic acid solution was poured into a beaker and added with 100 mL of purified water to precipitate a white mass. A solution of the mass in 50 g of acetone was gradually poured into 300 mL of purified water while vigorously stirring. The resulting microfine resin was collected by filtration and then vacuum-dried at room temperature. The obtained resin was 5.34 g by mass and the yield was 61.5% of the theoretical yield based on the initial charge.

Figure 5:
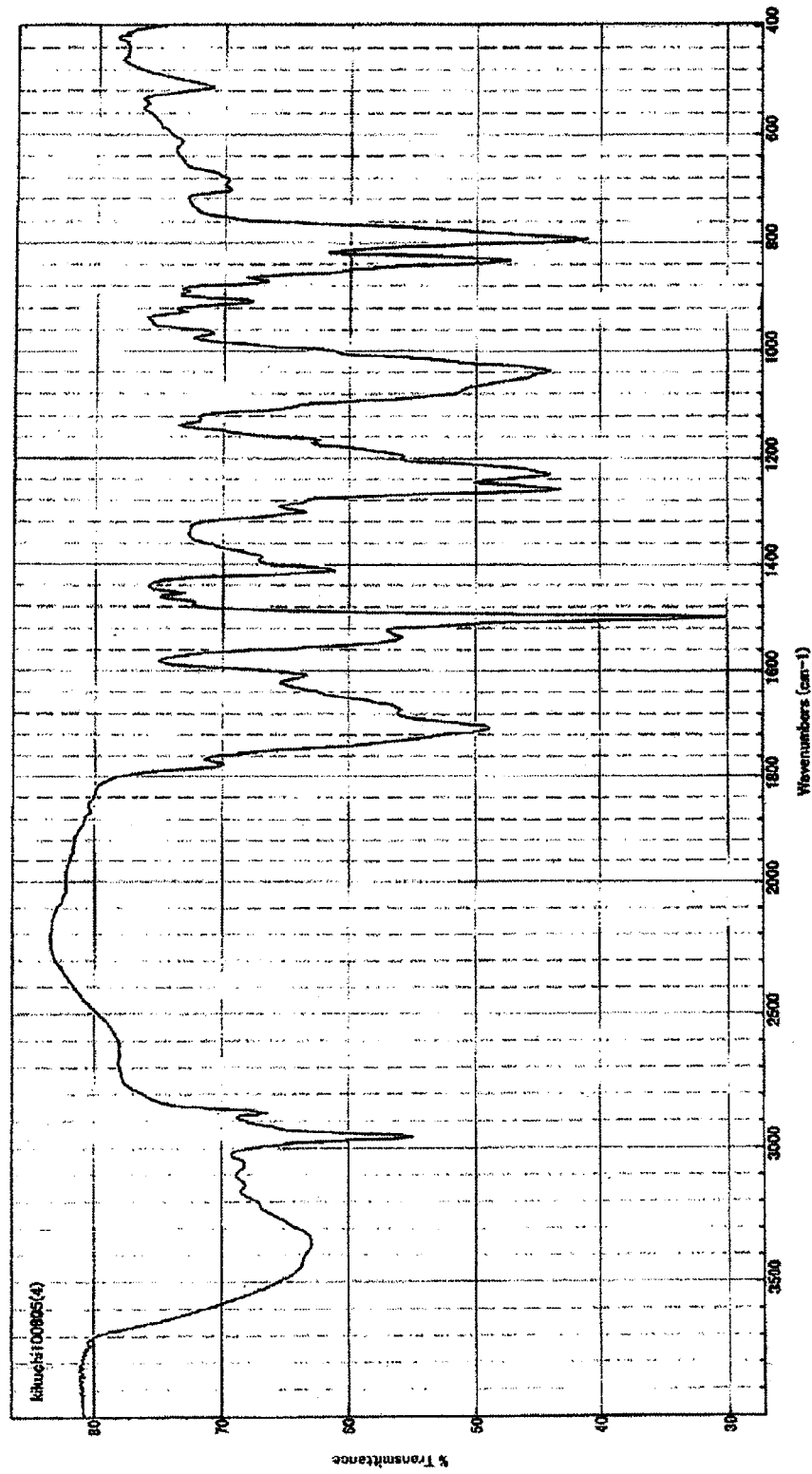
FIG. 5 shows FT-IR spectrum of a polyamic acid resin obtained in Example 5.

To confirm whether the resulting resin was a polyamic acid resin, the resin was subjected to thermogravimetric analysis. The weight loss was 4.5% in a temperature range of from 120 to 180° C. (theoretical cyclodehydration: 4.9%). The FT-IR spectrum by an infrared spectrophotometer is shown in FIG. 5.

The polyamic acid resin was examined for the solubility at room temperature by adding a solvent to accurately weighed about 40 mg of the polyamic acid resin in an amount 10 times the weight of the polyamic acid resin. The polyamic acid resin was dissolved in methanol, tetrahydrofuran, acetone and N-methyl-2-pyrrolidinone, but not dissolved in toluene.

Example 6

Polyimide Resin Produced from exo-NB-TriSXDA of Synthesis Example 1 and Oxydianiline A polyimide resin having a higher molecular weight was produced in the following manner by increasing the concentration of the raw materials (total concentration of the tetracarboxylic dianhydride and the diamine) in the reaction system as compared with that in Example 1.

A 200-mL four-necked flask equipped with an agitation blade, a thermometer, a Dean-Stark fractional distillation tube and a nitrogen inlet tube was charged with 14.5792 g (27.16 mmol) of exo-NB-TriSXDA, 5.4386 g (27.16 mmol) of 4,4'-oxydianiline, 0.5986 g of 2-hydroxypyridine as a catalyst, and 113.36 g of 1,2-dichlorobenzene, and the stirring of the contents was started under heating. The total concentration of exo-NB-TriSXDA and 4,4'-oxydianiline in the reaction system was 15.0%.

After heating under stirring at 100° C. for 30 min, the reaction solution changed to a uniform transparent solution and then the temperature was raised to 179° C. (boiling point of 1,2-dichlorobenzene) over 30 min. The reaction was continued at the same temperature for 4 h. During the reaction, a white turbid mixture of 1,2-dichlorobenzene and water which was accumulated in an upper portion of the Dean-Stark fractional distillation tube was discharged and fresh 1,2-dichlorobenzene was added in the same amount as discharged.

After 4 h, the heating was stopped to cool the reaction solution. When the temperature inside the flask reached 65° C., 27 g of acetone was added. By pouring the resulting solution into 400 g of methanol in a beaker, a gummy mass was precipitated on the bottom of beaker. The precipitated mass was dissolved in 100 g of acetone and methanol was gradually added dropwise to the acetone solution. When 15 g of methanol was added, the solution was separated into two layers. The upper layer was removed and 45 g of methanol was added to the lower layer to precipitate a gummy mass. The gummy mass was placed in a drying oven at 90° C. for 4 h to remove the solvent. The obtained resin was 10.28 g and the yield was 51.3% of the theoretical yield based on the initial charge.

GPC analysis showed that the number-average molecular weight was 55,900 and the weight-average molecular weight was 88,200 when calibrated by a standard polystyrene.

The polyimide resin was formed into a film in the same manner as in Example 1, which was measured for the glass transition point and tensile properties. The glass transition point was 138° C., the tensile strength was 43 MPa, the elastic modulus was 1.54 GPa, and the elongation at break was 22%.

Example 7

Polyimide Resin Produced from Exo-NB-PentaSXDA of Synthesis Example 3 and Oxydianiline A polyimide resin having a higher molecular weight was produced in the following manner by increasing the concentration of the raw materials (total concentration of the tetracarboxylic dianhydride and the diamine) in the reaction system as compared with that in Example 3.

A 200-mL four-necked flask equipped with an agitation blade, a thermometer, a Dean-Stark fractional distillation tube and a nitrogen inlet tube was charged with 13.3685 g (19.51 mmol) of exo-NB-PentaSXDA, 3.9069 g (19.51 mmol) of 4,4'-oxydianiline, 0.5183 g of 2-hydroxypyridine as a catalyst, and 90.71 g of 1,2-dichlorobenzene, and the stirring of the contents was started under heating. The total concentration of exo-NB-PentaSXDA and 4,4'-oxydianiline in the reaction system was 16.0%.

After heating under stirring at 100° C. for 30 min, the reaction solution changed to a uniform transparent solution and then the temperature was raised to 179° C. (boiling point of 1,2-dichlorobenzene) over 30 min. The reaction was continued at the same temperature for 4 h. During the reaction, a white turbid mixture of 1,2-dichlorobenzene and water which was accumulated in an upper portion of the Dean-Stark fractional distillation tube was discharged and fresh 1,2-dichlorobenzene was added in the same amount as discharged.

After 4 h, the heating was stopped to cool the reaction solution. When the temperature inside the flask reached 65° C., 25 g of acetone was added. By pouring the resulting solution into 300 g of methanol in a beaker, a gummy mass was precipitated on the bottom of beaker. The precipitated mass was dissolved in 66 g of acetone and methanol was gradually added dropwise to the acetone solution. When 33 g of methanol was added, the solution was separated into two layers. The upper layer was removed and 40 g of methanol was added to the lower layer to precipitate a gummy mass. The precipitated mass was dissolved in 50 g of acetone and 23 g of methanol was added dropwise to the acetone solution to allow the solution to separate into two layers. The upper layer was removed and 40 g of methanol was added to the lower layer to precipitate a gummy mass. The gummy mass was placed in a drying oven at 90° C. for 4 h to remove the solvent. The obtained resin was 10.98 g by mass and the yield was 66.3% of the theoretical yield based on the initial charge.

GPC analysis showed that the number-average molecular weight was 89,800 and the weight-average molecular weight was 141,000 when calibrated by a standard polystyrene.

The polyimide resin was formed into a film in the same manner as in Example 1, which was measured for the glass transition point and tensile properties. The glass transition point was 88° C., the tensile strength was 29 MPa, the elastic modulus was 1.23 GPa, and the elongation at break was 127%.

Comparative Example 1

Polyimide Resin Produced from endo-NB-TriSXDA Meso Isomer of Synthesis Example 5 and Oxydianiline A polyimide resin was produced from endo-NB-TriSXDA meso isomer synthesized in Synthesis Example 5 in the following manner.

A 100-mL four-necked flask equipped with an agitation blade, a thermometer, a Dean-Stark fractional distillation tube and a nitrogen inlet tube was charged with 6.0239 g (11.222 mmol) of endo-NB-TriSXDA meso isomer, 2.2471 g (11.222 mmol) of 4,4'-oxydianiline, 0.2459 g of 2-hydroxypyridine as a catalyst, and 57.91 g of 1,2-dichlorobenzene. Subsequently, the reaction was carried out in the same manner as in Example 1, thereby precipitating a resin.

The obtained resin was 5.34 g by mass and the yield was 67.9% of the theoretical yield based on the initial charge. GPC analysis showed that the number-average molecular weight was 11,900 and the weight-average molecular weight was 25,600 when calibrated by a standard polystyrene.

Since the obtained resin was brittle and had a low molecular weight, the resin was dissolved again in acetone, and methanol was added to the obtained solution to reprecipitate the resin. The obtained resin was 2.85 g by mass and the yield was 36.2% of the theoretical yield based on the initial charge. GPC analysis showed that the number-average molecular weight was 19,800 and the weight-average molecular weight was 31,900 when calibrated by a standard polystyrene.

Figure 6:
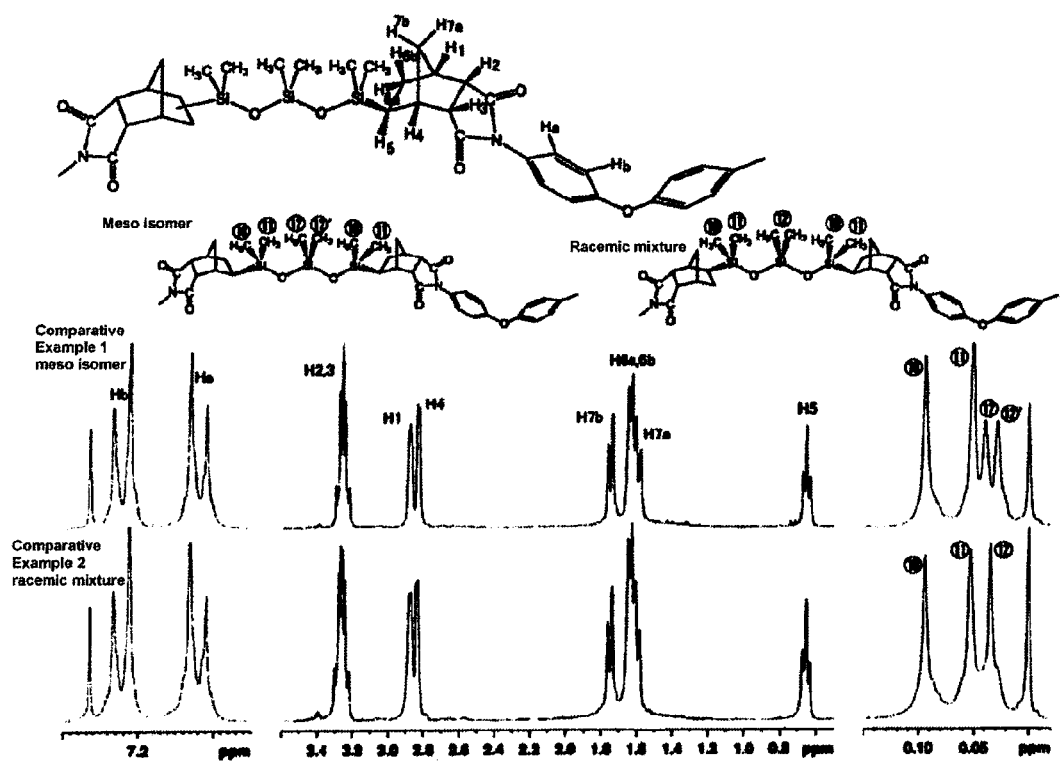
FIG. 6 shows ¹H-NMR spectra of polyimide resins obtained in Comparative Examples 1 and 2.

FIG. 6 shows a $^1$H-NMR spectrum of the obtained polyimide resin, which reflects the structure of repeating unit. In particular, the peak attributable to two methyl groups on the central silicon atom of the trisiloxane moiety was split into two peaks (0.029 ppm and 0.040 ppm), showing that the polyimide resin was a meso isomer.

The polyimide resin was examined for the solubility in the same manner as in Example 1. The polyimide resin was dissolved in tetrahydrofuran, acetone and N-methyl-2-pyrrolidinone, but formed a cloudy turbid liquid with toluene, which was separated into two layers after leaving it to stand.

The polyimide resin was dissolved in N,N-dimethylacetamide and formed into a film in the same manner as in Example 1. However, the tensile test and the measurement of a glass transition point under tension using a thermogravimetric analyzer were impossible due to the brittleness of the film Therefore, the polyimide resin was pulverized into fine powder using an agate mortar and the obtained fine powder was measured for the glass transition point by a differential scanning calorimeter. The results are shown in Table 1.

The measurement of the light transmittance using an ultraviolet-visible spectrophotometer was barely carried out. The spectrum is shown in FIG. 2. As clearly seen from FIG. 2, the polyimide resin obtained in Example 1 had a high light transmittance in a wavelength range of about 290 to about 350 nm to exhibit a good transparency as compared with the polyimide resin obtained in Comparative Example 1.

Comparative Example 2

Polyimide Resin Produced from endo-NB-TriSXDA Racemic Mixture of Synthesis Example 6 and Oxydianiline A polyimide resin was produced from endo-NB-TriSXDA racemic mixture synthesized in Synthesis Example 6 in the following manner.

A 100-mL four-necked flask equipped with an agitation blade, a thermometer, a Dean-Stark fractional distillation tube and a nitrogen inlet tube was charged with 10.1676 g (18.9414 mmol) of endo-NB-TriSXDA racemic mixture, 3.7924 g (18.939 mmol) of 4,4'-oxydianiline, 0.4176 g of 2-hydroxypyridine as a catalyst, and 97.71 g of 1,2-dichlorobenzene. Subsequently, the reaction was carried out in the same manner as in Example 1, thereby precipitating a resin. Further, the resin was reprecipitated in the same manner as in Comparative Example 1 to obtain a resin having a number-average molecular weight of 15,700 and a weight-average molecular weight of 27,500 when calibrated by a standard polystyrene. The obtained resin was 6.65 g by mass and the yield was 50.0% of the theoretical yield based on the initial charge.

FIG. 6 shows a $^1$H-NMR spectrum of the obtained polyimide resin, which reflects the structure of repeating unit. The single peak (0.035 ppm) demonstrates that two methyl groups on the central silicon atom in the trisiloxane moiety are equivalent, showing that the obtained polyimide resin is a racemic mixture.

The polyimide resin was dissolved in N,N-dimethylacetamide and formed into a film in the same manner as in Example 1. However, the tensile test and the measurement of a glass transition point under tension using a thermogravimetric analyzer were impossible due to the brittleness of the film Therefore, the polyimide resin was pulverized into fine powder using an agate mortar and the obtained fine powder was measured for the glass transition point by a differential scanning calorimeter. The results are shown in Table 1.

Comparative Example 3

Polyimide Resin Produced from exo-NB-DiSXDA of Synthesis Example 7 and Oxydianiline A 100-mL four-necked flask equipped with an agitation blade, a thermometer, a Dean-Stark fractional distillation tube and a nitrogen inlet tube was charged with 4.3735 g (9.453 mmol) of exo-NB-DiSXDA synthesized in Synthesis Example 7, 1.8929 g (9.453 mmol) of 4,4'-oxydianiline, 0.1882 g of 2-hydroxypyridine as a catalyst, and 43.88 g of 1,2-dichlorobenzene, and the stirring of the contents was started under heating. The total concentration of exo-NB-DiSXDA and 4,4'-oxydianiline in the reaction system was 12.5%.

The reaction for synthesis of the polyimide resin was carried out in the same manner as in Example 1 and the obtained resin was purified in the same manner as in Example 6. The obtained resin was 2.69 g by mass and the yield was 43.0% of the theoretical yield based on the initial charge.

GPC analysis showed that the number-average molecular weight was 25,700 and the weight-average molecular weight was 35,700 when calibrated by a standard polystyrene.

The polyimide resin was examined for the solubility in the same manner as in Example 1. The polyimide resin was dissolved in tetrahydrofuran, acetone and N-methyl-2-pyrrolidinone, but formed a cloudy turbid liquid with toluene, which was separated into two layers after leaving it to stand.

The polyimide resin was formed into a film in the same manner as in Example 1, which was measured for the glass transition point and tensile properties. The glass transition point was 178° C., the tensile strength was 41 MPa, the elastic modulus was 1.86 GPa, and the elongation at break was 2.6%.

Comparative Example 4

Polyimide Resin Produced from endo-NB-TetraSXDA of Synthesis Example 8 and Oxydianiline A 100-mL four-necked flask equipped with an agitation blade, a thermometer, a Dean-Stark fractional distillation tube and a nitrogen inlet tube was charged with 5.9255 g (9.699 mmol) of endo-NB-TetraSXDA synthesized in Synthesis Example 8, 1.9414 g (9.698 mmol) of 4,4'-oxydianiline, 0.237 g of 2-hydroxypyridine as a catalyst, and 55.08 g of 1,2-dichlorobenzene, and the stirring of the contents was started under heating. The total concentration of endo-NB-TetraSXDA and 4,4'-oxydianiline in the reaction system was 12.5%.

The reaction for synthesis of the polyimide resin was carried out in the same manner as in Example 1 and the obtained resin was purified in the same manner as in Example 1. The obtained resin was only 0.69 g by mass and the yield was 8.8% of the theoretical yield based on the initial charge.

GPC analysis showed that the number-average molecular weight was 17,600 and the weight-average molecular weight was 28,200 when calibrated by a standard polystyrene.

The polyimide resin was examined for the solubility in the same manner as in Example 1. The polyimide resin was dissolved in tetrahydrofuran, acetone, toluene and N-methyl-2-pyrrolidinone.

It was attempted to form a film of the polyimide resin in the same manner as in Example 1. However, many cracks occurred in the coated layer on the glass plate, failing to obtain a film. The glass transition point was 104° C. when measured on a powdery sample using a differential scanning calorimeter.

TABLE 1

|  | Example 1 | Example 2 | Example 3 |
|---|---|---|---|
| Tetracarboxylic dianhydride |  |  |  |
| Structure | exo | exo | exo |
| Number of silicon atoms (n) | 3 | 4 | 5 |
| Distribution of n | only 3 | only 4 | only 5 |
| GPC purity (area %) | 99.5 | 98.7 | 99.7 |
| Viscosity (Pa · s) | 38.4 (40° C.) | 22.5 (25° C.) | 5.84 (25° C.) |
| Refractive index | — | 1.4825 | 1.4735 |
| Melting point (° C.) | — | — | — |
| Polyimide |  |  |  |
| Mn | 30,400 | 40,500 | 59,900 |
| Mw | 56,200 | 68,400 | 106,800 |
| Glass transition point (° C.) | 140 | 107 | 83 |
| Tensile strength (MPa) | 41 | 36 | 25 |
| Elastic modulus (GPa) | 1.53 | 1.47 | 1.09 |
| Elongation at break (%) | 6.4 | 35 | 73 |

|  | Example 4 | Comparative Example 1 | Comparative Example 2 |
|---|---|---|---|
| Tetracarboxylic dianhydride |  |  |  |
| Structure | exo | endo meso isomer | endo racemic mixture |
| Number of silicon atoms (n) | 5.11 (average) | 3 | 3 |
| Distribution of n | 3 to 11 | only 3 | only 3 |
| GPC purity (area %) | 99.8 | 99.6 | 98.4 |
| Viscosity (Pa · s) | 4.11 (25° C.) | — | — |
| Refractive index | 1.4706 | — | — |
| Melting point (° C.) | — | 143 to 144 | 117 to 120 |
| Polyimide |  |  |  |
| Mn | 31,900 | 19,800 | 15,700 |
| Mw | 50,400 | 31,900 | 27,500 |
| Glass transition point (° C.) | 77 | 126 | 131 |
| Tensile strength (MPa) | 23 | unmeasurable | unmeasurable |
| Elastic modulus (GPa) | 1.02 | unmeasurable | unmeasurable |
| Elongation at break (%) | 7.6 | unmeasurable | unmeasurable |

Note:
The number of silicon atoms (n) in the exo structure means a total number of silicon atoms contained in the compound represented by formula (3), i.e., n = m + 1.

INDUSTRIAL APPLICABILITY

In accordance with the present invention, a polyimide resin which has a good transparency and a high molecular weight and is excellent in mechanical properties, such as tensile strength and elongation, and well soluble in general-purpose solvents, and a polyamic acid resin as a precursor of the polyimide resin are obtained. The polyimide resin and the polyamic acid resin have properties suitable as materials for use in the field of optoelectronics.

What is claimed is:

1. A polyimide resin comprising repeating units represented by formula (1):

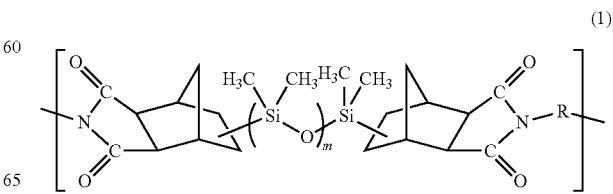

(1)

wherein R is a diamine residue or a diisocyanate residue; m is an integer of 2 to 30; any of silicon atoms bonded to norbornane rings is in exo configuration with respect to the norbornane rings; and any of imide rings bonded to the norbornane rings is in exo configuration with respect to the norbornane rings.

2. A polyamic acid resin comprising repeating units represented by formula (2):

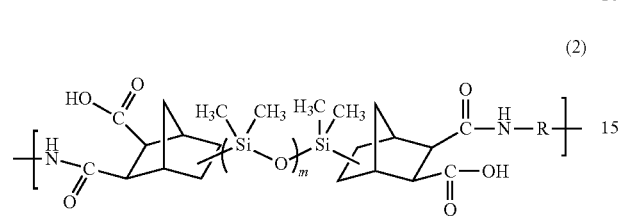

wherein R is a diamine residue; m is an integer of 2 to 30; any of silicon atoms bonded to norbornane rings is in exo configuration with respect to the norbornane rings; and any of amide groups and carboxyl groups bonded to the norbornane rings is in exo configuration with respect to the norbornane rings.

3. A process for producing the polyimide resin as defined in claim 1, comprising a step of allowing a diamine or a diisocyanate to react with a tetracarboxylic dianhydride represented by formula (3):

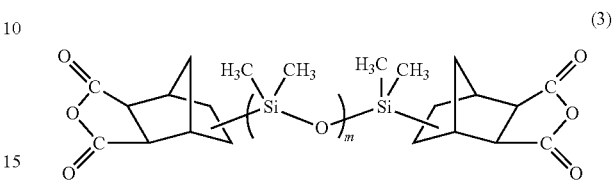

wherein m is an integer of 2 to 30; any of silicon atoms bonded to norbornane rings is in exo configuration with respect to the norbornane rings; and any of acid anhydride groups bonded to the norbornane rings is in exo configuration with respect to the norbornane rings.

* * * * *